US008663596B2

(12) United States Patent
Garg et al.

(10) Patent No.: US 8,663,596 B2
(45) Date of Patent: Mar. 4, 2014

(54) REACTOR, A STRUCTURE PACKING, AND A METHOD FOR IMPROVING OXIDATION OF HYDROGEN SULFIDE OR POLYSULFIDES IN LIQUID SULFUR

(75) Inventors: Diwakar Garg, Emmaus, PA (US); Xianming Jimmy Li, Orefield, PA (US); Uday Navin Parekh, Allentown, PA (US); Jung Soo Choe, Gwynedd Valley, PA (US); Elmo Nasato, Oakville, CA (US)

(73) Assignee: Fluor Enterprises, Inc., Irving, TX (US)

( * ) Notice: Subject to any disclaimer, the term of this patent is extended or adjusted under 35 U.S.C. 154(b) by 169 days.

(21) Appl. No.: 12/692,978

(22) Filed: Jan. 25, 2010

(65) Prior Publication Data

US 2011/0182802 A1 Jul. 28, 2011

(51) Int. Cl.
*C01B 17/027* (2006.01)
*B01J 8/02* (2006.01)

(52) U.S. Cl.
USPC ........................................ 423/578.1; 422/211

(58) Field of Classification Search
USPC ........................................ 422/211; 423/578.1
See application file for complete search history.

(56) References Cited

U.S. PATENT DOCUMENTS

| | | | | |
|---|---|---|---|---|
| 1,972,885 | A * | 9/1934 | Gleason et al. | 95/211 |
| 3,727,384 | A | 4/1973 | Feldman | |
| 3,822,341 | A * | 7/1974 | Smith | 423/574.1 |
| 4,280,990 | A * | 7/1981 | Jagodzinski et al. | 423/574.1 |
| 4,296,050 | A * | 10/1981 | Meier | 261/112.2 |
| 4,537,605 | A * | 8/1985 | Gouw | 95/264 |
| 4,576,925 | A * | 3/1986 | Alkhazov et al. | 502/307 |
| 4,729,887 | A | 3/1988 | Pendergraft | |
| 5,338,465 | A | 8/1994 | Lockhart et al. | |
| 5,454,988 | A * | 10/1995 | Maeda | 261/112.2 |
| 5,632,967 | A | 5/1997 | Nasato | |
| 5,744,523 | A | 4/1998 | Barkowsky et al. | |
| 6,149,887 | A | 11/2000 | Lagas et al. | |

(Continued)

FOREIGN PATENT DOCUMENTS

| | | |
|---|---|---|
| CA | 1088276 | 10/1980 |
| CA | 1250409 | 2/1989 |

(Continued)

OTHER PUBLICATIONS

Clark, P.D., et al.; "A New Approach Towards Small Scale Sulfur Recovery and Liquid Sulfur Degassing"; Presentation at the Laurance Reid Gas Conditioning Conference (2009-2010); pp. 351-264.

(Continued)

*Primary Examiner* — Walter D Griffin
*Assistant Examiner* — Huy-Tram Nguyen
(74) *Attorney, Agent, or Firm* — Fish & Associates, PC

(57) ABSTRACT

Disclosed is a reactor, a structured packing, and a method for increasing the rate of decomposition of polysulfides and oxidation of polysulfides and hydrogen sulfide in liquid sulfur. The reactor, the structured packing, and the method involve a structured packing for contacting a first stream and a second stream in a reactor including a catalyst. The catalyst increases the rate of decomposition of polysulfides and oxidation of polysulfides and hydrogen sulfide in the liquid sulfur of the first stream with the second stream. The first stream includes liquid sulfur containing polysulfides and dissolved hydrogen sulfide. The second stream includes an oxygen-containing gas.

27 Claims, 3 Drawing Sheets

(56) References Cited

U.S. PATENT DOCUMENTS

| | | | |
|---|---|---|---|
| 6,199,318 | B1 | 3/2001 | Stewart et al. |
| 6,224,793 | B1 | 5/2001 | Hoffman et al. |
| 6,255,367 | B1 | 7/2001 | Bitler et al. |
| 6,265,360 | B1 | 7/2001 | DeTar et al. |
| 6,321,567 | B1 * | 11/2001 | Lockett et al. ............ 62/643 |
| 6,353,068 | B1 | 3/2002 | Dietz et al. |
| 6,357,728 | B1 | 3/2002 | Sunder et al. |
| 6,521,200 | B1 * | 2/2003 | Silveston et al. ......... 423/512.1 |
| 6,534,022 | B1 * | 3/2003 | Carlborg et al. ............ 422/180 |
| 6,540,984 | B2 | 4/2003 | Stewart et al. |
| 6,831,116 | B2 | 12/2004 | Bitler et al. |
| 6,946,107 | B2 * | 9/2005 | Carlborg et al. .......... 423/239.1 |
| 6,989,417 | B2 | 1/2006 | Bitler et al. |
| 2001/0018484 | A1 | 8/2001 | Bitler et al. |
| 2001/0051119 | A1 * | 12/2001 | Overbeek et al. ............ 422/211 |
| 2001/0056164 | A1 | 12/2001 | Duncum et al. |
| 2003/0094713 | A1 * | 5/2003 | Sunder et al. ............ 261/112.2 |
| 2003/0106837 | A1 * | 6/2003 | Kaibel et al. ............... 208/46 |
| 2003/0147946 | A1 | 8/2003 | Stewart et al. |
| 2004/0250465 | A1 | 12/2004 | Deng et al. |
| 2006/0236597 | A1 | 10/2006 | Deng et al. |

FOREIGN PATENT DOCUMENTS

| | | |
|---|---|---|
| CN | 101380562 A | 3/2009 |
| DE | 10128130 | 6/2001 |
| DE | 10128130 A1 | 6/2001 |
| EP | 0785019 | 7/1997 |
| EP | 0 915 055 A1 | 5/1999 |
| EP | 0 851 836 B1 | 1/2000 |
| EP | 1036590 A2 * | 9/2000 |
| FR | 2 360 510 A1 | 3/1978 |
| GB | 1578230 | 11/1980 |
| JP | 61-256904 A | 11/1986 |
| JP | 3-045505 A | 2/1991 |
| WO | 9833846 | 8/1998 |
| WO | 9855221 | 12/1998 |
| WO | 0148032 | 7/2001 |
| WO | 2008040750 | 4/2008 |

OTHER PUBLICATIONS

Krishna et al., (last update: Nov. 22, 2000), Structured Catalytic Bubble Column Reactors Research at University of Amsterdam; accessed on Mar. 5, 2013 at http://ct-cr4.chem.uva.nl/structuredbc/.

* cited by examiner

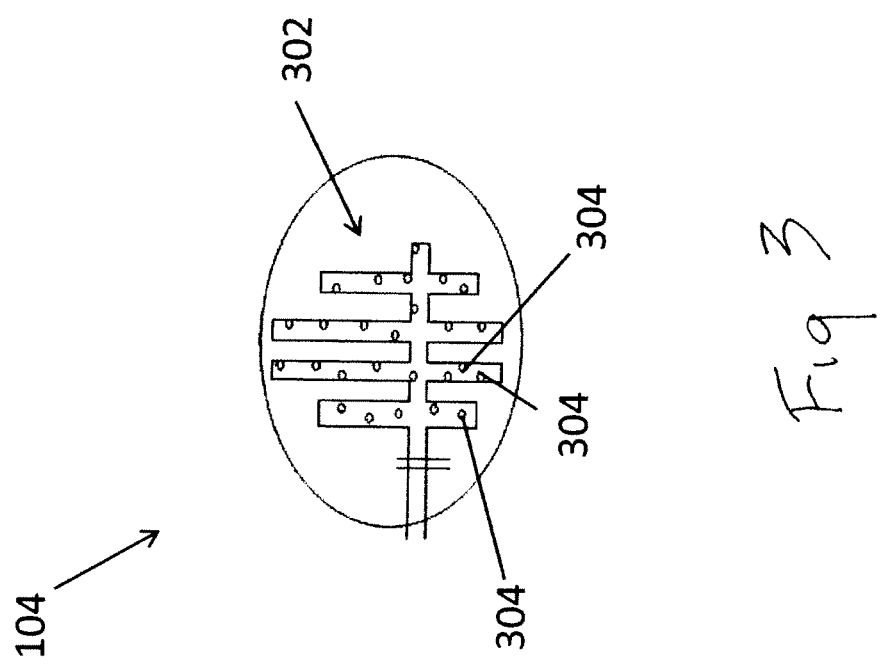

REACTOR, A STRUCTURE PACKING, AND A METHOD FOR IMPROVING OXIDATION OF HYDROGEN SULFIDE OR POLYSULFIDES IN LIQUID SULFUR

BACKGROUND OF THE INVENTION

The present invention is directed to a reactor, a structured packing, and a method for improving oxidation of hydrogen sulfide and/or polysulfides in liquid sulfur. More specifically, the reactor, the structured packing, and the method involve a catalyst for improving oxidation of the hydrogen sulfide and/or the polysulfides.

Generally, the Claus process is used to recover sulfur from hazardous waste gas streams containing hydrogen sulfide gas produced during refining of petroleum products and natural gas processing. The Claus process involves partially combusting hydrogen sulfide in air, oxygen, or oxygen-enriched air to produce sulfur dioxide. Sulfur dioxide then reacts with remaining hydrogen sulfide to produce sulfur. Sulfur is recovered from the Claus process in a liquid form. Handling of the liquid sulfur produced from the Claus process can be difficult due to the polysulfides and dissolved hydrogen sulfide gas present therein. The polysulfides degrade slowly, thereby producing toxic, odorous and highly flammable hydrogen sulfide gas. A large portion of the hydrogen sulfide gas is retained by liquid sulfur as a dissolved gas. A small portion of the hydrogen sulfide gas is released slowly into the environment. The gradual degradation of the polysulfides and the release of the dissolved hydrogen sulfide gas during storage and transportation involve substantial health, safety and environmental risks and have resulted in fires. The toxicity of hydrogen sulfide involves substantial safety risks.

Known processes have been developed to mitigate issues with the gradual release of hydrogen sulfide gas. In general, the processes involve accelerated decomposition of polysulfides and removal of dissolved hydrogen sulfide from liquid sulfur.

A known process for mitigating these issues is described in U.S. Pat. No. 5,632,967, which is hereby incorporated by reference in its entirety. The patent describes a first stream including liquid sulfur containing polysulfides and dissolved hydrogen sulfide and a second stream of oxygen-containing gas being contacted in a reactor (operated under pressure to increase oxygen partial pressure) packed with a mixing device. Specifically, the mixing device is submerged in the first stream including liquid sulfur and the second stream of oxygen-containing gas is bubbled into the first stream including liquid sulfur from the bottom of the reactor. The second stream of oxygen-containing gas oxidizes hydrogen sulfide and polysulfides present in the first stream including liquid sulfur to form sulfur and strip dissolved hydrogen sulfide from the liquid sulfur. The stripped hydrogen sulfide gas is removed from the top of the reactor along with any unused portions of the second stream of oxygen-containing gas. The stripped hydrogen sulfide gas and unused portions of the second stream of oxygen-containing gas may be recycled back to the reactor. The treated first stream including liquid sulfur includes less than about 10 parts per million by weight (ppmw) of combined polysulfides and dissolved hydrogen sulfide gas. The treated first stream including liquid sulfur is removed from the bottom of the reactor, stored as a liquid or solidified, then provided to end users.

Although the process described in U.S. Pat. No. 5,632,967 reduces the combined polysulfides and hydrogen sulfide amount in the liquid sulfur to less than about 10 ppmw, the process does not include decreasing the combined polysulfides and hydrogen sulfide content in the liquid sulfur to less than 5 ppmw. To meet increased environmental restrictions, a decreased combined polysulfides and hydrogen sulfide content in the liquid sulfur is desired. In addition, improved energy efficiency and operational costs are also desired. Furthermore, the process described in U.S. Pat. No. 5,632,967 involves a catalyst in a packed bed of spherical or pelletized catalyst. Catalytic oxidation of hydrogen sulfide and polysulfides in this patent mix the first stream and the second stream in the packed bed resulting in a high pressure drop and gradual crushing or disintegration of the spherical or pelletized catalyst, thereby contaminating the treated liquid sulfur stream and reducing marketable value of the treated liquid sulfur.

U.S. Pat. No. 6,149,887, which is hereby incorporated by reference in its entirety, discloses a method for removing hydrogen sulfide and hydrogen polysulfide compounds from liquid sulfur by stripping with a gas. U.S. Pat. No. 6,149,887 expressly suggests that use of a catalyst is disfavored. U.S. Pat. No. 6,149,887 suggests that introducing a catalyst to the liquid sulfur and, thereafter, stripping the catalyst from the sulfur can result in several drawbacks. This patent suggests that use of the catalyst may clog portions of the system and/or result in catalyst being present in the removed sulfur.

What is needed is a method and system for further decreasing combined polysulfides and hydrogen sulfide content in liquid sulfur, a method and system for decreasing combined polysulfides and hydrogen sulfide content in liquid sulfur having improved energy efficiency, and/or a method and system for decreasing combined polysulfides and hydrogen sulfide content in liquid sulfur having decreased operational costs.

BRIEF SUMMARY OF THE INVENTION

This invention solves problems associated with conventional practices by providing a method and system for oxidizing and decomposing certain constituents of the liquid sulfur. The term "liquid sulfur" refers to a liquid phase or medium comprising about 100 ppmw to about 600 ppmw hydrogen sulfide and about 100 ppmw to about 600 ppmw polysulfides (e.g., $H_2S_x$) and trace level contaminants such as nitrogen sulfur compounds. The term "polysulfides" refers to at least one member selected from the group consisting of $H_2S_x$, where x is an integer equal to or greater than 2, and mixtures thereof.

One aspect of the present disclosure includes a reactor including a first inlet for a first stream including liquid sulfur containing polysulfides and dissolved hydrogen sulfide, a second inlet for a second stream of oxygen-containing gas, and a structured packing for contacting the first stream and the second stream, the structured packing having a catalyst. The catalyst accelerates rates of decomposition and oxidation of polysulfides and oxidation of hydrogen sulfide in the liquid sulfur of the first stream with the second stream.

Another aspect of the present disclosure includes a structured packing for contacting a first stream and a second stream in a reactor including a catalyst. The catalyst increases the rate of oxidation of hydrogen sulfide and decomposition and oxidation of polysulfides in the liquid sulfur of the first stream with the second stream (e.g., oxidation of hydrogen sulfide to $SO_2$ and elemental sulfur and decomposition and oxidation of polysulfides to $H_2S$, $SO_2$ and elemental sulfur). The first stream includes liquid sulfur containing polysulfides and dissolved hydrogen sulfide. The second stream includes an oxygen-containing gas.

Another aspect of the present disclosure includes a method of oxidizing hydrogen sulfide and decomposing and oxidizing polysulfides in liquid sulfur includes providing a first stream including liquid sulfur containing polysulfides and dissolved hydrogen sulfide, providing a second stream of oxygen-containing gas, and contacting the first stream and the second stream in a structured packing having a catalyst. The catalyst accelerates rates of decomposition and oxidation of polysulfides and oxidation of hydrogen sulfide in the liquid sulfur of the first stream with the second stream.

In a further aspect of the invention, a catalyst coated packing is employed in order to achieve an accelerated decomposition of $H_2S_x$ to $H_2S$, and partial oxidation to elemental sulfur and $SO_2$ and oxidation of hydrogen sulfide to $SO_2$ and elemental sulfur. The converted $H_2S$ produced by decomposition of polysulfides is in turn oxidized to $SO_2$ and to elemental sulfur. Elemental sulfur is also produced by the reaction of $H_2S$ with $SO_2$.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

FIG. 3 shows a gas diffuser according to an exemplary embodiment of the reactor.

DETAILED DESCRIPTION OF THE INVENTION

Provided is a method and system for further decreasing combined polysulfides and hydrogen sulfide content in liquid sulfur, having reduced equipment size, improved energy efficiency, and having decreased operational costs. Embodiments of the present disclosure further decrease combined polysulfides and hydrogen sulfide content in liquid sulfur, reduce equipment size due to improved reaction kinetics, improve energy efficiency, and/or decrease operational costs.

Figure 1:
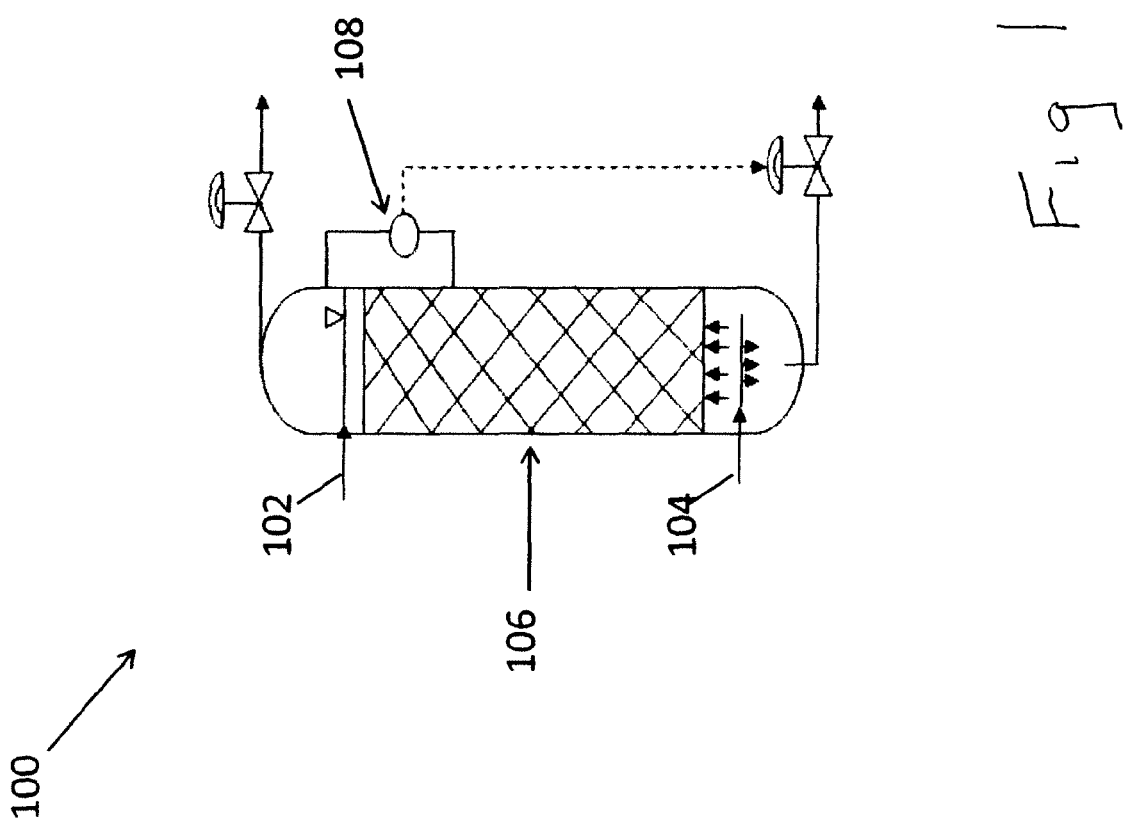
FIG. 1 shows an exemplary reactor according to an embodiment of the disclosure.

Referring to FIG. 1, an embodiment of the present disclosure includes a reactor 100 having a first inlet 102 for a first stream including liquid sulfur containing polysulfides and dissolved hydrogen sulfide, a second inlet 104 for a second stream of oxygen-containing gas, and a region 106 for contacting the first stream and the second stream.

The reactor 100 can be made of any suitable material (for example, carbon steel or other materials inert to oxidizing gases, liquid sulfur, and/or moist hydrogen sulfide gas). The reactor 100 can be operated under any suitable conditions and may be operated under pressure to increase oxygen partial pressure. In one embodiment, the reactor 100 may be operated at a pressure range of about 30 psig to about 120 psig or a range of about 40 psig to about 80 psig. The operating pressure range may be established based upon the concentration of oxygen in the second stream of oxygen-containing gas. For example, a low range of operating pressure may be used with high concentrations of oxygen in the second stream. A high range of operating pressure may be used with low concentrations of oxygen in the second stream.

As shown in FIG. 1, the first inlet 102 for the first stream including liquid sulfur containing polysulfides and dissolved hydrogen sulfide is positioned at the top of the reactor 100. However, alternate inlet positioning may be used. The first stream after being exposed to the second stream is removed from the bottom of the reactor 100, stored as a liquid or solidified, then provided to end users. The removed stream typically includes less than about 10 parts per million by weight (ppmw) of total polysulfides and dissolved hydrogen sulfide gas content. The first stream may be pumped into the reactor 100 from any suitable source of liquid sulfur. For example, the first stream may be from a pit used to accumulate liquid sulfur from a Claus sulfur recovery plant. The first stream may be heated or cooled to a temperature range from about 250° F. to about 295° F., or a range of about 265° F. to about 285° F. prior to being pumped into the reactor 100. The range may be established to avoid a sharp increase in viscosity (for example, maintaining a temperature above about 305° F.) The flow of the first stream is controlled with a liquid level monitor 108 to maintain the structured packing in a submerged configuration. Upon the liquid level monitor indicating that the structured packing is at or near a configuration of incomplete submergence, the flow of the first stream may be increased. The flow is also controlled to provide a preselected residence time in the reactor 100, to achieve a desired level of polysulfides removal from the first stream, and/or to achieve a desired level of hydrogen sulfide gas removal from the first stream.

As shown in FIG. 1, the second inlet 104 for the second stream of oxygen-containing gas is positioned at the bottom of the reactor 100. However, alternate inlet positioning may be used. The second stream can be air, oxygen-enriched air, or oxygen mixed with any suitable inert gas (for example, nitrogen and/or carbon dioxide). In one embodiment, the second stream is heated from about 150° F. to about 200° F. prior to being introduced into the reactor 100. The second stream may be provided by any suitable source of oxygen-containing gas. For example, the second stream may be compressed using a blower or any other suitable device and provided to second inlet 104. The second stream may include oxygen from about 15% by volume to about 28% by volume, or about 21% by volume to about 28% by volume. The range may be established to avoid issues with oxygen safe cleanliness of the reactor and/or transfer lines for oxygen service. The range of partial pressure of oxygen in the second stream may vary from a range of about 6.7 psia to about 37.7 psia or a range of about 8.2 psia to about 26.5 psia.

The flow rate of the second stream at the second inlet 104 may be established based upon the flow rate of the first stream, concentration of oxygen in the second stream, and/or operating pressure in the reactor 100. While any suitable molar ratio of first to second stream can be employed, typically the ratio will range from about 10 to about 60, preferably from about 20 to about 50. Normally the liquid sulfur will be introduced into the reactor at a location above or higher than the oxygen-containing stream.

In one embodiment, the flow rate of the second stream is selected to provide a predetermined amount of oxygen for the oxidation of the polysulfides and $H_2S$. In one embodiment, the flow rate of the second stream is selected to provide intimate mixing of the first stream and the second stream. In another embodiment, the flow rate of the second stream is selected to decompose and oxidize polysulfides and strip and oxidize dissolved hydrogen sulfide from the first stream including liquid sulfur containing polysulfides and dissolved hydrogen sulfide.

The region 106 for contacting the first stream and the second stream may be a structured packing, such as a static mixing device, positioned between the first inlet and the second inlet. In a vertical reactor, region 106 may be positioned in about the middle of the reactor with the first inlet positioned at the top of the reactor and the second inlet positioned at the bottom of the reactor. The stripped hydrogen sulfide gas may be removed from the top of the reactor along with any unused portions of the second stream of oxygen-containing gas. The unused portions of the second stream of oxygen-containing gas may be recycled back to the reactor. As used here, the term "structured packing" refers to a static physical arrangement of structures or features that facilitates or enhances liquid to gas contact during countercurrent flow and/or concurrent flow.

In the structured packing, the second stream of oxygen-containing gas oxidizes polysulfides and hydrogen sulfide present in the first stream including liquid sulfur to form $SO_2$ and/or elemental sulfur and strip dissolved hydrogen sulfide from the liquid sulfur. In an embodiment of the present disclosure, the first stream including liquid sulfur contacts a catalyst in or around the structured packing. Use of the catalyst promotes decomposition of polysulfides to hydrogen sulfide, oxidation of polysulfides to elemental sulfur and/or $SO_2$ and oxidation of hydrogen sulfide to $SO_2$ and/or elemental sulfur.

Figure 2:
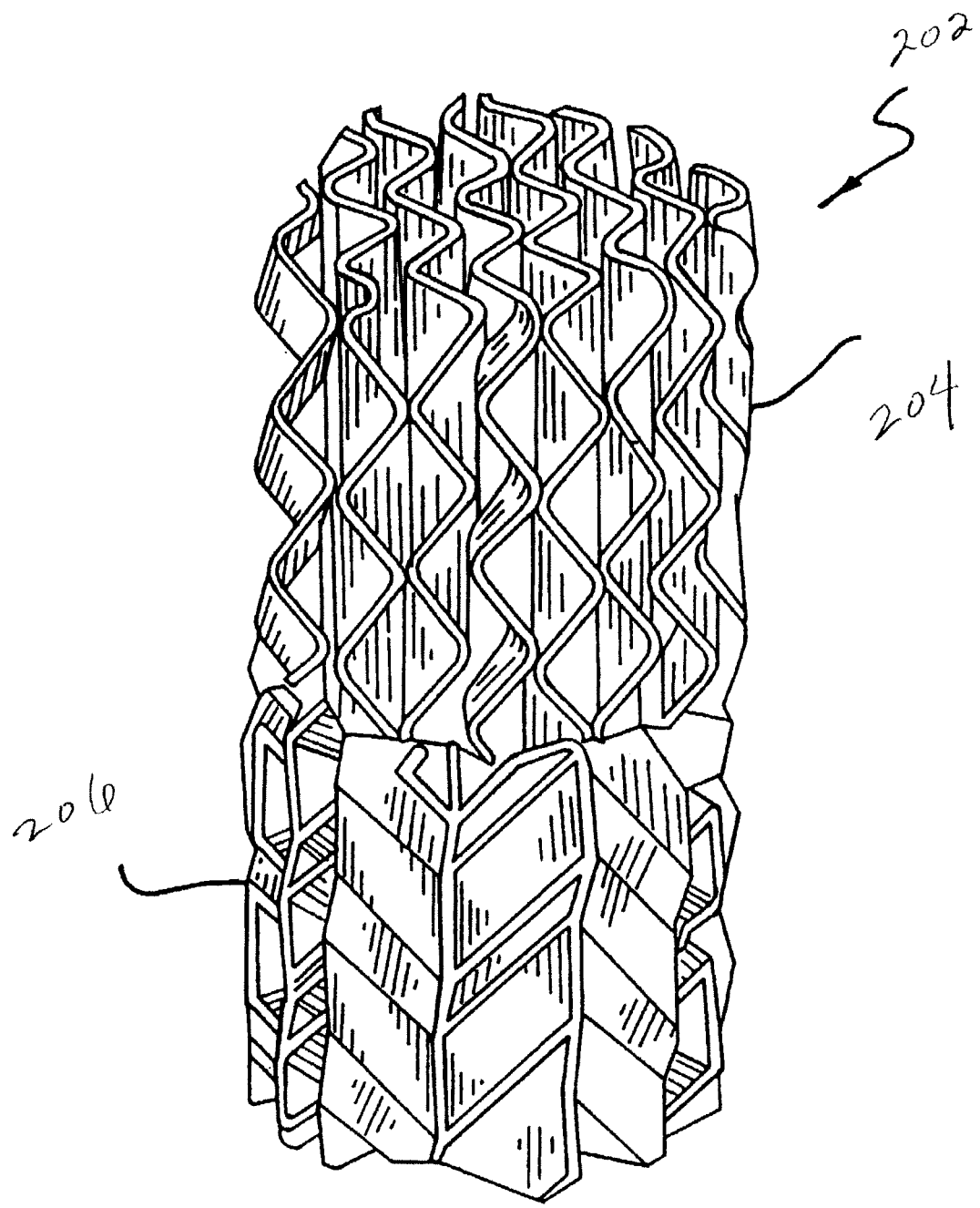
FIG. 2 shows an exemplary structured packing according to an embodiment of the disclosure.

Positioning the catalyst in region 106 for contacting the first stream and the second stream can permit the combined polysulfides and hydrogen sulfide levels to be lower (for example, less than about 5 ppmw, or less than 1 ppmw). FIG. 2 shows an exemplary embodiment where a structured packing 202 within region 106 is coated with a catalyst 204. In another embodiment, the catalyst may be positioned in region 106 by the structured packing being formed by the catalyst (at least in part). In another embodiment, the catalyst may be positioned in region 106 by the structured packing securing the catalyst (for example, in a cage). The positioning of the catalyst within region 106 may reduce pressure drop in comparison to a pressure drop associated with a packed bed having spherical or pelletized catalyst. In addition, positioning the catalyst in region 106 for contacting the first stream and the second stream can accelerate decomposition and oxidation of polysulfides and oxidation of hydrogen sulfide and eventually permit the reactor to be a smaller size.

In the embodiment shown in FIG. 2, the textures configuration of catalyst 204 coated on structured packing 202 may increase the surface area of catalyst 204, thereby improving decomposition and oxidation of polysulfides and oxidation of hydrogen sulfide, and/or may improve mixing of the first stream and the second stream by increasing the complexity of the surface of structured packing 202. Thus, the coated structured packing 202 may accelerate the decomposition and oxidation of polysulfides and oxidation of hydrogen sulfide and the removal of dissolved hydrogen sulfide from the liquid sulfur.

In one embodiment, the catalyst may form or be attached to the structured packing. The structured packing may be formed of any suitable material. For example, the structured packing may be formed of a ceramic material, for example KATAPAK-K or KATAPAK-M from Sulzer Chemtech, USA. In one embodiment, the ceramic material can be made of bauxite, activated alumina (aluminum oxide), titania (titanium oxide or dioxide), iron oxide or a mixture of alumina, iron oxide and titania. In this embodiment, a base material making up the structured packing acts as the catalyst for decomposition and oxidation of the polysulfides and oxidation of $H_2S$ and no further coating of the structure is performed. Thus, in the embodiment, the structured packing may be substantially devoid of a catalyst coating. In another embodiment, the structured packing, despite including the catalyst, may include a catalyst coating for providing desired reactions.

Additionally or alternatively, the structured packing may be formed of a suitable metal material. For example, the structured packing may be formed of stainless steel, carbon steel, Monel, Hastelloy, titanium, nickel, high-nickel alloys, and/or aluminum containing alloys. The metal may contain small or trace amounts of one or more other metals including, but not limited to molybdenum, silicon, niobium, and/or titanium. In one embodiment, the metal may be titanium and a steel composition including iron, aluminum, and chromium such as, for example, FeCrAlloy. In one embodiment, the structured packing is substantially devoid of yellow metals. By substantially free of yellow metals, it is meant that the structured packing contains less than about 1 weight percent of copper. In another embodiment, the metal may be titanium. In the embodiment, the surface of the titanium metal is cleaned by any suitable chemical and/or mechanical treatment to remove impurities, the surface is oxidized by thermal treatment in the presence of an oxygen containing gas to form a layer of titanium dioxide, which will serve as the catalyst for decomposing and oxidizing polysulfides and oxidizing hydrogen sulfide.

In one embodiment, the structure packing includes open cross-flow channels. The open cross-flow channels of the structured packing may be made of stacked corrugated sheets with angles varying in a range of about 45 degrees to about 60 degrees. The height of the corrugation in a corrugated sheet (from maximum point to minimum point) may be from about 1 mm to about 6 mm. Thus, including two corrugated sheet may provide an opening from about 2 mm to about 12 mm for the first stream and the second stream to flow through in the cross-flow channels of the structured packing.

The structured packing may enhance gas holdup in comparison to an empty column. Specifically, at intersection points of the channels, the shear forces caused by having gas and liquid flowing counter-currently split the gas phase into small bubbles, thereby reducing the velocity of gas rising in the reactor. The reduced velocity and tortuous path increase the residence time and mixing of the gas and liquid within the reactor by increasing contact time.

Referring to FIG. 2, structured packing 202 includes a flow pattern for a predetermined flow rate of gas and liquid, a predetermined size of gas bubbles entering the structured packing, and/or a flow opening 206 in the structured packing. For example, when the size of the gas bubbles is larger than flow opening 206 in the structured packing, the bubbles face flow resistance, spend considerable time outside the packing, and/or struggle to enter the structured packing. As shown in FIG. 2, structured packing 202 includes a flow opening 206 slightly larger than the size of the gas bubbles entering structured packing 202. In one embodiment, the flow opening may be about 4 mm and the gas bubbles are slightly smaller than 4 mm. In another embodiment, the structured packing may include a flow opening substantially larger than the size of the gas bubbles entering the structured packing.

In one embodiment, the size of the gas bubbles may be controlled at the second inlet 104 for introducing the second stream of oxygen-containing gas. For example, as shown in FIG. 3, second inlet 104 may be a gas diffuser 302 or sparger of a preselected shape and size. In one embodiment, the shape may be a circular ring or a star pattern with a number of holes to substantially uniformly distribute the second stream of oxygen-containing gas into the reactor. In another embodiment, a ladder type distributor may be used. As shown in FIG. 3, the size of openings 304 in gas diffuser 302 corresponds in size to flow opening 206 in structured packing 202. For example, opening 304 in gas diffuser 302 may be about four times smaller than flow opening 206 in structured packing 202 since the size of gas bubbles emerging out of gas diffuser 302 is generally three to four times larger than the size of opening 304.

In one embodiment, a sintered metal diffuser sparger with about 50 to 150 micron sized pores forms the second inlet 104 for the second stream. The sintered metal diffuser disperses the second stream as fine bubbles in the first stream including liquid sulfur. The sintered metal diffuser sparger improves contact and contact time between the first stream and the second stream in the structured packing. The sintered metal diffuser may be formed of 316L, 304L, 347, or 430 stainless steel, Inconel, Monel 400, Nickel 200, Hastelloy C276, C22 and X, and/or Alloy20 and can be purchased from Mott Corporation of USA.

The catalyst may be any suitable catalyst. In one embodiment, the catalyst may coat the structured packing. For example, the structured packing may have a material surface coated with a high surface area, porous catalytic material including bauxite (mineral form of titanium dioxide), titania, alumina (thermally stable α-alumina, θ-alumina or dehydrated and thermally stabilized γ-alumina also known as activated alumina), a mixture of silica with alumina, a mixture of silica and titania, or a mixture of alumina and titania, iron oxide and/or combinations thereof. Alumina catalyst material may be stabilized against degradation by heat and moisture with the use of materials such as zirconia, titania, and/or rare earth metal oxides (such as ceria, lanthanum oxide, and rare earth oxide mixtures). Likewise, titania catalyst material can be mixed with zirconia, titania, and/or rare earth metal oxides (such as ceria, lanthanum oxide, and rare earth oxide mixtures). Both alumina and titania based catalysts can be promoted with iron oxide and/or alkaline metal oxides such as oxides of sodium, potassium, lithium, calcium, and/or strontium.

As used herein, the term "thermally stabilized alumina" refers to a temperature-stabilized form of alumina that is obtained by subjecting Boehmite, Gibbsite, and/or similar hydrated or activated alumina precursors to an elevated temperature, thereby converting substantially all of the hydrated or activated precursors to more temperature-stable forms of alumina such as γ-alumina. The thermally stabilized γ-alumina may comprise greater than about 80% γ-alumina or greater than about 90% γ-alumina by weight with the remainder being in the forms of alumina such as η, κ-alumina, θ-alumina and α-alumina. The surface area of thermally stabilized γ-alumina in powder form may vary from about 40 $m^2/g$ to about 450 $m^2/g$. Likewise, the surface area of titania powder used for coating the structured packing with titania catalyst may vary from 40 $m^2/g$ to about 450 $m^2/g$. Furthermore, the surface area of silica powder mixed with either activated alumina and/or titania may vary from 40 $m^2/g$ to about 450 $m^2/g$.

Low surface area, thermally stabilized alumina in the form of θ-alumina and α-alumina can also be used for coating structured packing. They are obtained by subjecting boehmite, γ-alumina, or similar hydrated or activated alumina precursors to an elevated temperature, thereby converting substantially all of the hydrated or activated precursors to more temperature-stable forms of alumina such as, for example, θ-alumina and α-alumina. Preferably, thermally stabilized alumina comprises greater than about 50% θ-alumina or α-alumina, and more preferably greater than about 75% θ-alumina or α-alumina. The remainder of the thermally stabilized alumina may comprise other forms of alumina such as, for example, α-, γ-, η, and κ-alumina. The surface area of thermally stabilized θ-alumina in powder form may vary from about 20 $m^2/g$ to about 100 $m^2/g$. Likewise, the surface area of α-alumina in powder form may vary from about 5 $m^2/g$ to about 40 $m^2/g$.

The application of catalytic material on the surface of structured packing material may include (a) preparing a flowable aqueous slurry using the desired coating material, (b) contacting the structured packing material with the aqueous slurry to form a coating, and (c) calcining the coated material at a temperature of from 300° C. to 1,000° C. to form the coated structured packing.

The aqueous slurry can be prepared by charging the desired amount of water and selected catalytic material along with various additives and promoters and mixing all the ingredients thoroughly. A ball mill with zirconia or ceramic balls as the grinding/mixing medium or other known techniques can be used for preparing the slurry. It may optionally be desirable to adjust pH of the aqueous slurry to below about 5 to facilitate good adhesion of coating on the metallic and ceramic surface of structured packing material. The acidity may be provided by the use of a minor amount of a water-soluble organic or inorganic acid such as, for example, hydrochloric or nitric acid, or a lower fatty acid such as acetic acid. The concentration of selected catalytic material by dry weight in the slurry may range from about 2 wt. % to about 30 wt. %, or from about 5 wt. % to about 20 wt. %.

In one embodiment, the aqueous slurry for coating the structure packing with titania can be prepared by (1) mixing thoroughly titania powder and water and optionally an acid, (2) coating the structured packing with the slurry using a suitable technique, (3) drying the coating in air, and (4) calcining at a temperature varying from 300° C. to 1000° C. for a suitable amount of time. A technique such as dipping the structured packing into the slurry or spraying slurry onto the structure can be used to coat the structure. The coating can be dried by heating in air to a temperature varying from 120° C. to 150° C. for 5 minutes to several hours. Calcining of coating can be carried out by heating the coated structure to the desired temperature in the presence of air for 15 minutes to several hours. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final titania coating. Furthermore, a small amount of hydrated alumina in the form Boehmite can be added to the slurry to acts as a binder for the titania coating. The hydrated alumina will transform into activated alumina during the calcination of the coating.

In another embodiment, the aqueous slurry for coating the structure with activated alumina can be prepared by (1) mixing thoroughly γ-alumina powder and water and optionally an acid, (2) coating structure with the slurry using a suitable technique, (3) drying the coating in air, and (4) calcining at a temperature varying from 300° C. to 700° C. for a suitable amount of time. The coating can be dried by heating in air to a temperature varying from 120° C. to 150° C. for 5 minutes to several hours. Calcining of coating again can be carried out by heating the coated structure to the desired temperature in the presence of air for 15 minutes to several hours. A technique such as dipping the structure into the slurry or spraying slurry onto the structure can be used to coat the structure. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final activated alumina coating. Furthermore, a small amount of hydrated alumina in the form Boehmite can be added to the slurry to acts as a binder for the activated alumina coating. The hydrated alumina will transform into activated alumina during the calcination of the coating.

In another embodiment, the aqueous slurry for coating the structure with activated alumina can be prepared by (1) mixing thoroughly θ-alumina or α-alumina powder and water and optionally an acid, (2) coating structure with the slurry using a suitable technique, (3) drying the coating in air, and (4) calcining at a temperature varying from 300° C. to 1,000° C. for a suitable amount of time. The coating can be dried by heating in air to a temperature varying from 120° C. to 150° C. for 5 minutes to several hours. Calcining of coating again can be carried out by heating the coated structure to the desired temperature in the presence of air for 15 minutes to several hours. A technique such as dipping the structure into the slurry or spraying slurry onto the structure can be used to coat the structure. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final activated alumina coating. Furthermore, a small amount of hydrated alumina in the form Boehmite can be added to the slurry to acts as a binder for the activated alumina coating. The hydrated alumina will transform into activated alumina during the calcination of the coating.

In another embodiment, the aqueous slurry for coating the structure with a mixture of titania and activated alumina can be prepared by (1) mixing thoroughly titania and γ-alumina powders and water and optionally an acid, (2) coating structure with the slurry using a suitable technique, (3) drying the coating in air, and (4) calcining at a temperature varying from 300° C. to 1000° C. for a suitable amount of time. A technique such as dipping the structure into the slurry or spraying slurry onto the structure can be used to coat the structure. The coating can be dried by heating in air to a temperature varying from 120° C. to 150° C. for 5 minutes to several hours. Calcining of coating then can be carried out by heating the coated structure to the desired temperature in the presence of air for 15 minutes to several hours. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final titania/activated alumina coating. Furthermore, a small amount of hydrated alumina in the form Boehmite can be added to the slurry to acts as a binder for the titania/activated alumina coating. The hydrated alumina will transform into activated alumina during the calcination of the coating. The proportion of titania in the final titania-activated alumina coating may vary from 20% to 80% by weight. Likewise the proportion of activated alumina in the final titania-activated alumina coating may vary from 20% to 80% by weight.

In another embodiment, the aqueous slurry for coating the structure with a mixture of titania and θ-alumina or α-alumina can be prepared by (1) mixing thoroughly titania and θ-alumina or α-alumina powders and water and optionally an acid, (2) coating structure with the slurry using a suitable technique, (3) drying the coating in air, and (4) calcining at a temperature varying from 300° C. to 1000° C. for a suitable amount of time. A technique such as dipping the structure into the slurry or spraying slurry onto the structure can be used to coat the structure. The coating can be dried by heating in air to a temperature varying from 120° C. to 150° C. for 5 minutes to several hours. Calcining of coating then can be carried out by heating the coated structure to the desired temperature in the presence of air for 15 minutes to several hours. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final titania/θ-alumina or α-alumina coating. Furthermore, a small amount of hydrated alumina in the form Boehmite can be added to the slurry to acts as a binder for the titania/θ-alumina or α-alumina coating. The hydrated alumina will transform into activated alumina during the calcination of the coating. The proportion of titania in the final titania-θ-alumina or α-alumina coating may vary from 20% to 80% by weight. Likewise the proportion of activated alumina in the final titania-θ-alumina or α-alumina coating may vary from 20% to 80% by weight.

As mentioned above any suitable method may be employed to coat the surface of structured packing material with the aqueous slurry. Such methods may include painting, brushing, spraying, dipping, and flow-coating.

The amount of titania in the final titania-based coating may vary from about 90% to about 98% by weight. The amount of silica and/or zirconia in the final totania-based coating may vary from about 0% to about 10% by weight. The amount of rare earth oxide in the final titania-based coating may vary from about 0 to 10% by weight. The amount of iron oxide and/or alkaline metal oxide in the final titania-based coating may vary from about 0 to 5% by weight.

The amount of activated alumina, θ-alumina or α-alumina in the final alumina-based coating may vary from about 90% to about 98% by weight. The amount of silica and/or zirconia in the final alumina-based coating may vary from about 0% to about 5% by weight. The amount of rare earth oxide in the final alumina-based coating may vary from about 0% to 5% by weight. The amount of iron oxide and/or alkaline metal oxide in the final alumina-based coating may vary from about 0 to 5% by weight.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A reactor, comprising:
   a first inlet for a first stream including liquid sulfur containing polysulfides and dissolved hydrogen sulfide;
   a second inlet for a second stream of oxygen-containing gas;
   a structured packing comprising corrugated sheeting having elongated cross-flow channels between adjacent sheets, and the structured packing further having side walls in contact with a catalyst;
   wherein the amount of catalyst is sufficient to increase the rate of decomposition of the polysulfides and oxidation of the polysulfides and hydrogen sulfide present in the liquid sulfur of the first stream with the second stream; and
   wherein the second inlet includes apertures corresponding in size to a flow opening in the structured packing such that bubbles emanating from the apertures have a size that is equal or smaller than a size of the flow opening.

2. The reactor of claim 1, wherein the structured packing is positioned between the first inlet and the second inlet.

3. The reactor of claim 1, wherein flow of the first stream through the first inlet is controlled to provide a preselected residence time in the reactor, to achieve a desired level of polysulfides removal from the first stream, and to achieve a desired level of hydrogen sulfide gas removal from the first stream.

4. The reactor of claim 1, wherein the corrugated sheeting is coated with the catalyst.

5. The reactor of claim 1, wherein the corrugated sheeting comprises the catalyst.

6. The reactor of claim 1, wherein the corrugated sheeting secures the catalyst.

7. The reactor of claim 1, wherein the catalyst is selected from the group consisting of bauxite, titania, alumina, a mixture of silica with thermally stable alumina, a mixture of silica, and titania, and combinations thereof.

8. The reactor of claim 7, wherein the catalyst is promoted with iron oxide or alkaline metal oxide.

9. The reactor of claim 1, wherein the corrugation angles vary in a range from 45 degrees to 60 degrees, inclusive.

10. The reactor of claim 1, wherein the corrugated sheeting includes a plurality of sheets the adjacent sheets are stacked to provide a 2 mm to 12 mm cross-flow channel opening, inclusive, for the first and second streams.

11. The reactor of claim 10, further comprising a diffuser that includes the apertures.

12. A structured packing for contacting a first stream and a second stream in a reactor, the structured packing comprising:
   a catalyst in contact with side walls of a layered sheeting comprising a plurality of corrugated sheets, the corrugations in each sheeting having corrugation angles between 45° and 60°, inclusive, the sheets layered and the corrugation angles varied in a manner that results in non-rectangular tubular cross-flow channels between adjacent sheets that are lossy between adjacent folds of juxtaposed sheets;
   wherein the catalyst is a polysulfide and hydrogen sulfide decomposition and oxidation catalyst that is effective to produce $SO_2$ and elemental sulfur from polysulfide and hydrogen sulfide,
   wherein the first stream includes liquid sulfur containing polysulfides and dissolved hydrogen sulfide, and
   wherein the second stream includes an oxygen-containing gas.

13. The structured packing of claim 12, wherein the structured packing is coated with the catalyst.

14. The structured packing of claim 12, wherein the structured packing is made up of the catalyst.

15. The structured packing of claim 12, wherein the structured packing secures the catalyst.

16. The structured packing of claim 12, wherein the catalyst is selected from the group consisting of bauxite, titania, alumina, a mixture of silica with thermally stable alumina, a mixture of silica and titania, and combinations thereof, and wherein the catalyst is positioned in the packing such as to enable reduction of combined polysulfides and hydrogen sulfide to a level of less than 5 ppmv.

17. The structured packing of claim 16, wherein the catalyst is promoted with iron oxide or alkaline metal oxide.

18. The reactor of claim 12, wherein the adjacent sheets are layered to provide a 2 mm to 12 mm cross-flow channel opening, inclusive, for the first and second streams.

19. A reactor, comprising:
   a first inlet for a first stream including liquid sulfur containing polysulfides and dissolved hydrogen sulfide;
   a second inlet for a second stream of oxygen-containing gas; and
   a structured packing comprising corrugated sheeting for facilitating contact between the first stream and the second stream, the structured packing further comprising a catalyst;
   wherein the amount of catalyst is sufficient to increase the rate of decomposition of the polysulfides and oxidation of the polysulfides and hydrogen sulfide present in the liquid sulfur of the first stream with the second stream; and
   wherein the structured packing is positioned between the first inlet and the second inlet, and the second inlet includes apertures corresponding in size to flow openings in the structured packing.

20. A reactor, comprising:
   a first inlet for a first stream including liquid sulfur containing polysulfides and dissolved hydrogen sulfide;
   a second inlet for a second stream of oxygen-containing gas; and
   a structured packing comprising corrugated sheeting for facilitating contact between the first stream and the second stream, the structured packing further comprising a catalyst;
   wherein the amount of catalyst is sufficient to increase the rate of decomposition of the polysulfides and oxidation of the polysulfides and hydrogen sulfide present in the liquid sulfur of the first stream with the second stream; and
   wherein the corrugated sheeting includes a plurality of sheets stacked to provide a 2 mm to 12 mm cross-flow channel opening, inclusive, for the first and second streams, and a diffuser that releases gas from the second stream in bubbles smaller than the cross-flow channel opening.

21. A method of treating hydrogen sulfide and polysulfides in liquid sulfur, the method comprising:
   providing through a first inlet a first stream including liquid sulfur containing polysulfides and hydrogen sulfide;
   providing through a second inlet a second stream of oxygen-containing gas; and
   in a structured packing, contacting the first stream and the second stream, the structured packing having corrugated sheeting with side walls that contact a catalyst, and elongated cross-flow channels at corrugation folds between adjacent sheets;

wherein the catalyst is sufficient to increase the rate of decomposition of polysulfides and oxidation of polysulfides and hydrogen sulfide in the liquid sulfur of the first stream with the second stream; and wherein the second inlet includes apertures corresponding in size to a flow opening in the structured packing such that hubbies emanating from the apertures have a size that is equal or smaller than a size of the flow opening.

22. The method of claim 21, further comprising adjusting flow of the first stream through the first inlet to provide a preselected residence time in the reactor, to achieve a desired level of polysulfides removal from the first stream, and to achieve a desired level of hydrogen sulfide gas removal from the first stream.

23. The method of claim 21, wherein the side walls are coated with the catalyst.

24. The method of claim 21, wherein the structured packing comprises the catalyst.

25. The method of claim 21, wherein the structured packing secures the catalyst.

26. The method of claim 21 wherein the second stream contacts a distributor.

27. The method of claim 26 wherein the distributor comprises a metal sparger diffuser.

* * * * *